3,212,930
POROUS CARBON ELECTRODE PREPARATION
Charles E. Thompson, Fanwood, and Elroy M. Gladrow, Edison Township, Middlesex County, N.J., assignors to Esso Research and Engineering Company, a corporation of Delaware
No Drawing. Filed May 29, 1961, Ser. No. 113,064
6 Claims. (Cl. 117—213)

This invention relates to a process for preparing improved carbon electrodes for use in electrical cells. In particular this invention relates to a novel process for achieving a more uniform distribution of catalyst in porous carbon electrodes and hence to a method for improving rates of electrochemical reaction in such cells. More particularly this invention relates to a novel pretreatment of the porous carbon structure prior to catalyst impregnation which comprises a controlled oxidation of the carbon surface at a temperature above about 200° C. and below the temperature at which significant amounts of a carbon oxide gas is evolved.

In the interest of simplicity, this invention will be primarily described with reference to the preparation of electrodes for use in power-producing fuel cells. However, it should be understood that electrodes prepared in accordance with this process may also be employed advantageously in electrolytic cells wherein electrical energy is consumed in the oxidation of an organic fuel.

Porous carbon electrodes are fabricated by intermixing finely ground graphitized and/or ungraphitized carbon with a carbonaceous binder which upon heating in a mold under pressure gives a solid porous structure. The surface energy of the structure is mainly dependent upon the composition of the binder and the temperature to which the mixture is heated. Carbon structures that have been found to be most suitable for fuel cell electrodes have been composited using pitch binders which when baked form a solid structure having a very low surface energy. Conventionally such structures are made suitable for electrode use by heating for about 1 to 10 hours in a carbon dioxide atmosphere to a temperature in the range of about 870° to 1100° C. to obtain a structure having the desired porosity. Catalytic agents are normally added to the carbon structure to form an active fuel cell electrode. Such structures are conventionally impregnated with catalyst by immersing the structure in a treating solution containing the catalytic metal in suitable form, e.g. water soluble salts such as the chlorides, nitrates, etc. or other water soluble compounds, such as for example, chloroplatinic acid. After soaking, the structure is in conventional practice dried and then heated to a temperature in the range of about 300°–550° C. under nitrogen or other oxygen free atmosphere for about 1–5 hours to decompose the metal containing compounds. Where it is desired to leave the catalyst in the form of elemental metal, reduction is effected by heating the electrode under hydrogen for about 1–5 hours at a temperature in the range of about 315°–550° C. Catalysts which may be deposited on electrodes in this manner include those commonly used in fuel cells, such as the noble metals, e.g. silver, gold, platinum, palladium, rhodium, iridium, ruthenium and mixtures thereof, transition heavy metals, such as nickel, cobalt, manganese, molybdenum and chromium or compounds containing these metals, such as cobalt molybdate, manganese molybdate, etc. This invention is not concerned with the application of any particular catalyst, but rather involves a process wherein the carbon structure to be impregnated is made more receptive to uniform distribution of the catalyst that is to be laid down.

It has now been discovered that superior fuel cell electrodes can be prepared in accordance with the processes hereinbefore described if prior to catalyst impregnation the carbon structure is pretreated with an oxidizing gas containing molecular oxygen at a temperature above about 200° C. and below that necessary to evolve carbon dioxide or carbon monoxide from the carbon surface at appreciable partial pressures. While the upper temperature tolerance will vary somewhat with the particular composition of the carbon structure employed, the process may be effectively carried out with all suitable carbon structures at a temperature in the range of about 200° to 500° C. The length of the treating time required will vary inversely with the temperature employed and advantageous results may be obtained at times above about 1 minute with the upper portion of the temperature range and high concentrations of oxygen to about 5 hours or more in the lower portion of the temperature range and/or when the oxygen is employed under high dilution.

In certain embodiments it will be found advantageous to employ an oxidizing gas which in addition to molecular oxygen contains a significant amount of water vapor, e.g. about 1 to 20 volume percent.

All other factors being equal, electrodes prepared in accordance with this process are characterized by exhibiting a higher open circuit potential when employed in a conventional fuel cell system. This in turn allows higher current densities to be drawn from the electrode for a given polarization.

This invention will be more easily understood from the following examples which are illustrative of the process herein disclosed and should not be considered as limitations upon the true scope of the invention as set forth in the claims.

EXAMPLE 1

A porous carbon cylinder having one closed end and measuring 1¾" x ¾" having an internal cavity measuring 1⁹⁄₁₆" x ⅜" was heated in carbon dioxide at 1800° F. for 6 hours and allowed to cool in a carbon dioxide atmosphere. The electrode was then heated to about 875° F. (468° C.) in a blanket of flowing nitrogen. At this temperature air was admitted to the nitrogen gas so that the oxygen content of the mixture was 2–3%. This gaseous mixture was passed through the vessel containing the electrode for 10 minutes at which time the supply of air was cut off and the system cooled in nitrogen. The electrode was then impregnated with catalyst by placing it in a vessel positioned within a vacuum desiccator. The vessel was evacuated to 1 mm. pressure, flushed with nitrogen and the impregnating solution was added. The impregnating solution consisted of an aqueous solution containing chloroplatinic acid and auric chloride in amounts so that the platinum concentration in such solution was 0.015 molar and the gold concentration was about 0.0007 molar. The carbon was left in contact with the solution for 4 days at which time the electrode had imbibed all of the metal ions present in the solution. The electrode was removed from the solution, air dried at 230° F. and then reduced by heating at 1000° F. in flowing hydrogen. This left distributed on the electrode a metal catalyst containing 95 wt. percent platinum and 5 wt. percent gold. The total amount of catalyst was about 1 wt. percent based on the total weight of the impregnated electrode. This electrode will hereinafter be designated electrode "A."

EXAMPLE 2

A porous carbon structure similar to that described in Example 1 was contacted with carbon dioxide at 1800° F. for 6 hours, cooled in carbon dioxide, and then heated to 875° F. (468° C.) under nitrogen. At this temperature the nitrogen was combined with water vapor and air in amounts such that the composite gas contained about 2% free oxygen, 3% water vapor and 95% nitrogen. The treatment was continued for about 15 minutes after which the flow of oxygen and water vapor was cut off and the electrode cooled in a nitrogen atmosphere. The electrode was then impregnated with a metal catalyst in the same amount of the same composition and in the same manner as described in Example 1. The electrode was then dried and reduced under hydrogen in accordance with the procedure set forth in Example 1. This electrode is hereinafter referred to as electrode "B."

EXAMPLE 3

A porous carbon cylinder structure similar to that described in Example 1 was heated under carbon dioxide at 1800° F. for 6 hours and cooled in carbon dioxide. The oxidation step carried out in Examples 1 and 2 was omitted and the electrode was impregnated with a metal catalyst in the same amount, of the same composition and in the same manner as effected in Examples 1 and 2. After impregnation the electrode was dried and subsequently reduced under hydrogen duplicating the procedures employed in Examples 1 and 2. This electrode is hereinafter referred to as electrode "C."

EXAMPLE 4

Electrodes "A," "B" and "C" were tested as the anode or fuel electrode of a fuel cell. The cell was operated at 180° F. with a 30% aqueous sulfuric acid electrolyte. The fuel supplied to the anode was ethane gas with oxygen comprising the oxidizing gas admitted to the cathode. The comparative performances of these electrodes are set forth in the following table:

Table I

| Electrode | Current Density, Max.[1], Amps./Ft.[2] | Volts Polarization [2] @ Amps./Ft.[2] | | |
|---|---|---|---|---|
| | | 0 | 4 | 8 |
| A | 9.0 | 0.34 | 0.48 | 0.63 |
| B | 8.5 | 0.34 | 0.50 | 0.66 |
| C | 6.3 | 0.40 | 0.58 | ([3]) |

[1] Maximum current obtained from electrode in system described, i.e. before polarization effects inhibit the reaction.
[2] Polarization in volts from a theoretical ethane electrode.
[3] This current density could not be reached with electrode "C" in this system.

The improvements in open circuit voltage and current density are reflective of a more uniform distribution of catalyst within the electrode since all of the treating conditions and materials employed are essentially the same.

The term "electrochemical cell" as employed herein refers to an apparatus for the transformation of chemical into electrical energy or the reverse which includes a cell container, an electrolyte, and immersed in the electrolyte a cathode by which electron flow enters the cell and an anode by which electron flow leaves the cell, a transfer of ions through the electrolyte resulting between cathode and anode.

The term "fuel cell" as employed herein refers to an electrochemical cell wherein chemical energy is converted directly to electrical energy by an electrochemical (anodic) oxidation of a combustible fuel and comprises a cell container, an anode and a cathode within such container, an electrolyte providing means for ion transfer between anode and cathode, conducting means external to said electrolyte for establishing electrical connection between anode and cathode, means for admitting a combustible fuel into dual contact with anode and electrolyte and means for admitting an oxidizing gas into dual contact with cathode and electrolyte.

The term "electrolytic cell" as employed herein refers to a power-consuming electrochemical cell in which an organic feedstock is oxidized and wherein electrical energy is provided to the cathode from an outside source in contrast to a fuel cell, hereinbefore defined, which generates electrical energy and is provided with fuel and oxidant from an outside source.

The term "combustible fuel" as employed herein shall include hydrogen, carbon monoxide, hydrocarbons and substituted hydrocarbons retaining at least one hydrogen atom in their molecular structure.

The term "molecular oxygen" as employed herein refers to free or uncombined oxygen and excludes ozone.

The terms "anode" and "fuel electrode" are used interchangeably herein.

What is claimed is:

1. A process for the preparation of a porous carbon electrode which comprises the steps of:
    (a) heating a porous carbon body for about 1 to 10 hours in a carbon dioxide atmosphere to a temperature in the range of about 870° to 1100° C.,
    (b) cooling the porous carbon body in a carbon dioxide atmosphere,
    (c) contacting said carbon body with molecular oxygen at a temperature in the range of about 200° to 500° C. for from 1 to 300 minutes, and
    (d) impregnating said carbon body with a catalyst yielding material from an aqueous solution containing said material.

2. A process for the preparation of an electrode which comprises the steps of:
    (a) heating a porous carbon body in carbon dioxide at a temperature in the range of about 870° to 1100° C. for from 1 to 10 hours,
    (b) cooling said body in a carbon dioxide atmosphere,
    (c) heating said body in a nitrogen atmosphere and contacting said body in said nitrogen atmosphere with molecular oxygen at a temperature between about 200° and 500° C.,
    (d) impregnating said body with a catalyst yielding material from an aqueous solution containing said material, and
    (e) reducing said catalyst yielding material in a hydrogen atmosphere for about 1 to 5 hours at a temperature in the range of about 315° to 550° C.

3. A process as in claim 2 wherein said molecular oxygen is contacted with said body for a time in the range of from 1 to 30 minutes in an oxidizing gas wherein the total oxygen concentration of said gas is at least 0.5 volume percent, said temperature being in the range of about 400° to 500° C.

4. A process as in claim 2 wherein said temperature is maintained in the range of about 200° to 400° C. for a time in the range of about 30 to 300 minutes.

5. A process in accordance with claim 2 wherein said oxygen is contacted with said body in an oxidizing gas containing water vapor in a concentration in the range of about 1 to 15 volume percent.

6. A process for the preparation of an electrode which comprises the steps of:
    (a) heating a porous carbon body in carbon dioxide at 982.5° C.,
    (b) cooling said body in a carbon dioxide atmosphere,
    (c) heating said body to 468° C. under nitrogen and then mixing the nitrogen with water vapor and air in amounts such that the composite gas contains about 2% free oxygen, 3% water vapor and about 95% nitrogen,
    (d) impregnating said body with an aqueous solution of chloroplatinic acid and gold chloride, and
    (e) reducing the metal ions by heating in hydrogen at 538° C.

References Cited by the Examiner

UNITED STATES PATENTS 2,938,064    5/60    Kordesch _____ 136—122

FOREIGN PATENTS 506,105    9/54    Canada.

JOHN H. MACK, Primary Examiner.